(12) United States Patent
Fletcher

(10) Patent No.: US 12,380,472 B2
(45) Date of Patent: *Aug. 5, 2025

(54) MOBILE DEVICE STREAMING MEDIA APPLICATION

(71) Applicant: Weple IP Holdings LLC, Austin, TX (US)

(72) Inventor: Mary Anne Fletcher, Jackson, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/423,133

(22) Filed: Jan. 25, 2024

(65) Prior Publication Data

US 2024/0169402 A1    May 23, 2024

Related U.S. Application Data

(63) Continuation of application No. 18/346,318, filed on Jul. 3, 2023, which is a continuation of application (Continued)

(51) Int. Cl.
*G06Q 30/0279* (2023.01)
*G06Q 30/02* (2023.01)
(Continued)

(52) U.S. Cl.
CPC ......... *G06Q 30/0279* (2013.01); *G06Q 30/02* (2013.01); *G06Q 30/0267* (2013.01); *G06Q 30/0269* (2013.01); *G06Q 30/0273* (2013.01); *G06Q 30/0641* (2013.01); *H04L 51/04* (2013.01); *H04L 51/52* (2022.05); *H04L 65/403* (2013.01); *H04L 65/60* (2013.01);
(Continued)

(58) Field of Classification Search
CPC .......... G06Q 30/0279; G06Q 30/0269; G06Q 30/0267; G06Q 30/0273; G06Q 30/0641; H04L 51/04; H04L 65/4076; H04L 65/04
USPC ....................................................... 709/227
See application file for complete search history.

(56) References Cited

U.S. PATENT DOCUMENTS

| 5,809,247 A | 9/1998 | Richardson et al. |
| 5,948,061 A | 9/1999 | Merriman et al. |

(Continued)

FOREIGN PATENT DOCUMENTS

| WO | 2005009019 A2 | 1/2005 |
| WO | 2008072093 A2 | 6/2008 |
| WO | 2010108053 A1 | 9/2010 |

OTHER PUBLICATIONS https://techcrunch.com/2009/03/05/ustream-launches-mobile-video-broadcasting-apps/ Ustream Launches Mobile Video Broadcasting Apps. Erick Schonfeld, Mar. 5, 2009.

(Continued)

*Primary Examiner* — Tauqir Hussain
(74) *Attorney, Agent, or Firm* — Avantech Law, LLP

(57) ABSTRACT

A system and process for coordinating streaming content or messages is provided. A network-connected server maintains a database containing media content-related data, such as the text of a message, accompanying media, time of airing, payment, and related comments. A user can view these feeds or streams of these consciousness messages by downloading a mobile application or browsing to a website. The application can also be used to create, schedule, and pay for a media content message.

30 Claims, 14 Drawing Sheets

Related U.S. Application Data

No. 17/705,331, filed on Mar. 27, 2022, now Pat. No. 11,734,730, which is a continuation of application No. 17/384,911, filed on Jul. 26, 2021, now Pat. No. 11,605,112, which is a continuation of application No. 16/812,495, filed on Mar. 9, 2020, now Pat. No. 11,074,627, which is a continuation of application No. 16/790,953, filed on Feb. 14, 2020, now Pat. No. 10,909,583, which is a continuation of application No. 16/157,269, filed on Oct. 11, 2018, now Pat. No. 10,565,628, which is a continuation of application No. 15/273,335, filed on Sep. 22, 2016, now Pat. No. 10,102,553, which is a continuation of application No. 15/041,422, filed on Feb. 11, 2016, now Pat. No. 9,456,013, which is a continuation of application No. 14/512,353, filed on Oct. 10, 2014, now Pat. No. 9,294,527, which is a continuation of application No. 13/967,414, filed on Aug. 15, 2013, now Pat. No. 8,862,678, which is a continuation of application No. 13/027,191, filed on Feb. 14, 2011, now Pat. No. 8,516,063.

(60) Provisional application No. 61/304,331, filed on Feb. 12, 2010.

(51) Int. Cl.

| | | |
|---|---|---|
| *G06Q 30/0241* | (2023.01) | |
| *G06Q 30/0251* | (2023.01) | |
| *G06Q 30/0273* | (2023.01) | |
| *G06Q 30/0601* | (2023.01) | |
| *H04L 51/04* | (2022.01) | |
| *H04L 51/52* | (2022.01) | |
| *H04L 65/403* | (2022.01) | |
| *H04L 65/60* | (2022.01) | |
| *H04L 65/611* | (2022.01) | |
| *H04L 65/613* | (2022.01) | |

(52) U.S. Cl.
CPC .......... *H04L 65/611* (2022.05); *H04L 65/613* (2022.05); *G06Q 30/0277* (2013.01)

(56) References Cited

U.S. PATENT DOCUMENTS

| | | |
|---|---|---|
| 6,396,500 B1 | 5/2002 | Qureshi et al. |
| 6,452,609 B1 | 9/2002 | Katinsky et al. |
| 6,654,785 B1 | 11/2003 | Craig |
| 6,744,868 B2 | 6/2004 | Mani |
| 6,757,273 B1 | 6/2004 | Hsu et al. |
| 7,064,760 B2 | 6/2006 | Capin et al. |
| 7,107,010 B2 | 9/2006 | Heinonen et al. |
| 7,171,629 B2 | 1/2007 | Quimby |
| 7,339,940 B2 * | 3/2008 | Boberg .................. H04W 4/12 370/401 |
| 7,386,623 B2 | 6/2008 | Nishimura et al. |
| 7,558,869 B2 | 7/2009 | Leon et al. |
| 7,575,172 B2 * | 8/2009 | Silverbrook ......... B41J 13/0063 358/1.9 |
| 7,593,740 B2 | 9/2009 | Crowley et al. |
| 7,620,426 B2 | 11/2009 | Ortiz et al. |
| 7,735,101 B2 | 6/2010 | Lanza et al. |
| 7,756,744 B2 * | 7/2010 | Schiff .................... G06Q 30/02 705/14.51 |
| 7,877,461 B1 | 1/2011 | Rimmer |
| 7,930,409 B2 | 4/2011 | Shitrit |
| 7,945,546 B2 | 5/2011 | Bliss et al. |
| 7,960,945 B1 | 6/2011 | Onorato et al. |
| 7,996,775 B2 | 8/2011 | Cole et al. |
| 8,028,092 B2 | 9/2011 | Brown et al. |
| 8,037,093 B2 | 10/2011 | Tiu, Jr. et al. |
| 8,086,253 B1 | 12/2011 | Kalamkar et al. |
| 8,108,781 B2 | 1/2012 | Laansoo et al. |
| 8,128,503 B1 | 3/2012 | Haot et al. |
| 8,219,028 B1 | 7/2012 | Flamholz |
| 8,219,134 B2 | 7/2012 | Maharajh et al. |
| 8,244,848 B1 | 8/2012 | Narayanan et al. |
| 8,255,552 B2 | 8/2012 | Witt et al. |
| 8,266,550 B1 | 9/2012 | Cleron et al. |
| 8,291,341 B2 | 10/2012 | Tseng et al. |
| 8,325,213 B2 | 12/2012 | Lamb et al. |
| 8,385,950 B1 | 2/2013 | Wagner et al. |
| 8,423,778 B2 | 4/2013 | Mohanty |
| 8,433,611 B2 | 4/2013 | Lax et al. |
| 8,493,931 B1 | 7/2013 | Nix |
| 8,516,063 B2 | 8/2013 | Fletcher |
| 8,527,496 B2 | 9/2013 | Wable et al. |
| 8,527,497 B2 | 9/2013 | Singh et al. |
| 8,560,678 B2 | 10/2013 | Tseng |
| 8,572,493 B2 | 10/2013 | Qureshi |
| 8,620,878 B2 | 12/2013 | Feher et al. |
| 8,701,020 B1 | 4/2014 | Fulcher et al. |
| 8,832,111 B2 | 9/2014 | Venkataramani et al. |
| 8,862,678 B2 | 10/2014 | Fletcher |
| 8,862,762 B1 | 10/2014 | Motrenko et al. |
| 8,997,006 B2 | 3/2015 | Whitnah et al. |
| 9,098,165 B2 | 8/2015 | Schoen et al. |
| 9,110,953 B2 | 8/2015 | Steinberg et al. |
| 9,119,027 B2 | 8/2015 | Sharon et al. |
| 9,123,079 B2 | 9/2015 | Zigoris et al. |
| 9,177,346 B2 | 11/2015 | Ahrens et al. |
| 9,218,496 B2 | 12/2015 | Callahan et al. |
| 9,294,527 B2 | 3/2016 | Fletcher |
| 9,456,013 B2 | 9/2016 | Fletcher |
| 9,571,422 B2 | 2/2017 | Hui et al. |
| 9,582,807 B2 | 2/2017 | Jin et al. |
| 9,602,605 B2 | 3/2017 | Wang et al. |
| 9,654,301 B2 | 5/2017 | Lipka et al. |
| 9,753,609 B2 | 9/2017 | Tseng |
| 9,823,803 B2 | 11/2017 | Tseng |
| 9,984,392 B2 | 5/2018 | Kendall et al. |
| 10,009,345 B2 | 6/2018 | Pearlman et al. |
| 10,083,461 B2 | 9/2018 | Schoen et al. |
| 10,102,552 B2 | 10/2018 | Fletcher |
| 10,102,553 B2 | 10/2018 | Fletcher |
| 10,332,157 B1 | 6/2019 | Grenager et al. |
| 10,565,628 B2 | 2/2020 | Fletcher |
| 10,909,583 B2 | 2/2021 | Fletcher |
| 11,070,890 B2 | 7/2021 | Carney et al. |
| 11,074,627 B2 | 7/2021 | Fletcher |
| 11,605,112 B2 | 3/2023 | Fletcher |
| 11,734,730 B2 | 8/2023 | Fletcher |
| 11,966,952 B1 | 4/2024 | Fletcher |
| 2002/0052781 A1 * | 5/2002 | Aufricht ............ G06Q 30/0273 705/14.69 |
| 2003/0023489 A1 * | 1/2003 | McGuire ............ G06Q 30/0257 705/14.66 |
| 2003/0105812 A1 * | 6/2003 | Flowers, Jr. .......... H04L 63/029 709/203 |
| 2003/0143993 A1 * | 7/2003 | Nagaoka ................ H04M 3/42 455/70 |
| 2003/0149978 A1 * | 8/2003 | Plotnick ........... H04N 21/41265 725/54 |
| 2004/0015562 A1 * | 1/2004 | Harper .................... H04L 67/01 709/217 |
| 2004/0071088 A1 | 4/2004 | Curcio et al. |
| 2004/0186877 A1 | 9/2004 | Wang et al. |
| 2004/0261033 A1 | 12/2004 | Mabon |
| 2005/0138560 A1 | 6/2005 | Lee et al. |
| 2005/0254526 A1 | 11/2005 | Wang et al. |
| 2005/0262145 A1 * | 11/2005 | Kawano ........... H04N 21/25891 348/E7.071 |
| 2005/0265555 A1 | 12/2005 | Pippuri |
| 2005/0283444 A1 | 12/2005 | Ekberg |
| 2006/0031548 A1 | 2/2006 | Funchess |
| 2007/0028279 A1 | 2/2007 | Kim |
| 2007/0099659 A1 * | 5/2007 | Borquez ................... G06F 8/20 455/3.06 |

(56) References Cited

U.S. PATENT DOCUMENTS

| | | | |
|---|---|---|---|
| 2007/0174490 A1* | 7/2007 | Choi | G06Q 30/02 707/E17.116 |
| 2007/0262953 A1 | 11/2007 | Zackschewski | |
| 2007/0294177 A1* | 12/2007 | Volk | G06Q 30/06 705/52 |
| 2008/0021775 A1 | 1/2008 | Lerman et al. | |
| 2008/0040498 A1 | 2/2008 | Setlur et al. | |
| 2008/0052154 A1* | 2/2008 | Gulliksen | G06Q 30/00 705/14.61 |
| 2008/0072139 A1 | 3/2008 | Salinas et al. | |
| 2008/0076409 A1 | 3/2008 | Hinrikus et al. | |
| 2008/0077956 A1 | 3/2008 | Morrison et al. | |
| 2008/0085682 A1 | 4/2008 | Rao | |
| 2008/0126415 A1 | 5/2008 | Chaudhury et al. | |
| 2008/0144781 A1 | 6/2008 | Liebermann et al. | |
| 2008/0154723 A1* | 6/2008 | Ferguson | G06Q 30/02 705/14.54 |
| 2008/0195664 A1 | 8/2008 | Maharajh et al. | |
| 2008/0216418 A1 | 9/2008 | Durham | |
| 2008/0235123 A1 | 9/2008 | Olliphant et al. | |
| 2008/0248788 A1* | 10/2008 | Smith | H04W 4/18 455/414.3 |
| 2008/0276266 A1 | 11/2008 | Huchital et al. | |
| 2009/0006191 A1 | 1/2009 | Arankalle et al. | |
| 2009/0017805 A1* | 1/2009 | Sarukkai | H04W 28/06 455/414.3 |
| 2009/0030988 A1 | 1/2009 | Kuhlke et al. | |
| 2009/0070219 A1 | 3/2009 | D'Angelo et al. | |
| 2009/0070832 A1 | 3/2009 | Urban | |
| 2009/0144772 A1 | 6/2009 | Fink et al. | |
| 2009/0156170 A1* | 6/2009 | Rossano | H04W 4/24 455/466 |
| 2009/0158136 A1* | 6/2009 | Rossano | H04L 61/4594 715/810 |
| 2009/0164299 A1* | 6/2009 | Gupta | G06Q 30/0275 705/14.71 |
| 2009/0171780 A1* | 7/2009 | Aldrey | G06Q 30/0273 705/14.69 |
| 2009/0197580 A1* | 8/2009 | Gupta | G06Q 30/02 455/414.2 |
| 2009/0198538 A1* | 8/2009 | Gupta | G06Q 30/0267 705/14.64 |
| 2009/0204479 A1* | 8/2009 | Wolinsky | G06Q 30/0259 705/14.57 |
| 2009/0248665 A1 | 10/2009 | Garg et al. | |
| 2009/0265243 A1* | 10/2009 | Karassner | G06Q 30/0275 705/14.54 |
| 2009/0292762 A1* | 11/2009 | Mettala | G06Q 30/02 709/203 |
| 2010/0037204 A1 | 2/2010 | Lin et al. | |
| 2010/0042700 A1* | 2/2010 | Harper | H04L 41/22 709/217 |
| 2010/0045666 A1 | 2/2010 | Kornmann et al. | |
| 2010/0060477 A1 | 3/2010 | Laasik et al. | |
| 2010/0060715 A1 | 3/2010 | Laasik et al. | |
| 2010/0063866 A1* | 3/2010 | Kinoshita | G06Q 30/02 705/7.29 |
| 2010/0064334 A1 | 3/2010 | Blackburn et al. | |
| 2010/0114739 A1* | 5/2010 | Johnston | G06Q 30/06 705/26.1 |
| 2010/0125491 A1* | 5/2010 | Elliott | G06Q 30/02 705/14.4 |
| 2010/0128103 A1 | 5/2010 | Sim et al. | |
| 2010/0153521 A1* | 6/2010 | Lor | G06F 15/16 709/219 |
| 2010/0153578 A1 | 6/2010 | Van Gassel et al. | |
| 2010/0161635 A1* | 6/2010 | Dey | H04L 65/612 707/758 |
| 2010/0174547 A1 | 7/2010 | Vos | |
| 2010/0198946 A1 | 8/2010 | Dowlatkhah et al. | |
| 2010/0215167 A1* | 8/2010 | Burneo | G06Q 10/00 379/207.02 |
| 2010/0235245 A1* | 9/2010 | Grossman | G06Q 30/0277 705/14.73 |
| 2010/0241968 A1* | 9/2010 | Tarara | G06F 3/0481 715/751 |
| 2010/0262711 A1 | 10/2010 | Bouazizi | |
| 2010/0325666 A1 | 12/2010 | Wiser et al. | |
| 2011/0016182 A1 | 1/2011 | Harris | |
| 2011/0035255 A1* | 2/2011 | Dasher | G06Q 30/0273 705/14.69 |
| 2011/0106622 A1* | 5/2011 | Kuhlman | G06Q 30/02 705/14.69 |
| 2011/0106626 A1* | 5/2011 | Zender | G06Q 30/0241 705/14.64 |
| 2011/0136427 A1* | 6/2011 | Al Qalqili | H04N 21/64322 455/414.1 |
| 2011/0138297 A1* | 6/2011 | Harper | H04L 12/1827 715/743 |
| 2011/0153362 A1* | 6/2011 | Valin | G06Q 20/1085 340/5.82 |
| 2011/0161987 A1 | 6/2011 | Huang et al. | |
| 2011/0184809 A1* | 7/2011 | Beavers | G06Q 30/0267 705/14.64 |
| 2011/0191432 A1 | 8/2011 | Layson, Jr. | |
| 2011/0196748 A1* | 8/2011 | Caron | G06Q 30/0276 715/764 |
| 2011/0208822 A1* | 8/2011 | Rathod | G06Q 30/02 709/206 |
| 2011/0213657 A1* | 9/2011 | O'Malley | H04M 3/42017 379/88.19 |
| 2011/0213665 A1* | 9/2011 | Joa | G06Q 40/00 705/14.72 |
| 2011/0246659 A1 | 10/2011 | Bouazizi | |
| 2011/0289433 A1* | 11/2011 | Whalin | H04L 51/52 715/753 |
| 2011/0307545 A1 | 12/2011 | Bouazizi | |
| 2012/0005287 A1 | 1/2012 | Gadel et al. | |
| 2012/0011267 A1 | 1/2012 | Ma et al. | |
| 2012/0079427 A1* | 3/2012 | Carmichael | G06F 16/44 715/825 |
| 2013/0182117 A1* | 7/2013 | Arseneau | H04N 21/6181 348/157 |
| 2014/0051402 A1 | 2/2014 | Qureshi | |
| 2015/0347487 A1 | 12/2015 | Cohan | |
| 2016/0210602 A1 | 7/2016 | Siddique et al. | |
| 2016/0309236 A1 | 10/2016 | Haot et al. | |
| 2018/0219976 A1* | 8/2018 | Decenzo | H04L 65/612 |
| 2019/0182297 A1 | 6/2019 | Monalto et al. | |
| 2020/0076747 A1 | 3/2020 | DeMattei | |
| 2023/0360092 A1 | 11/2023 | Fletcher | |

OTHER PUBLICATIONS http://thenextweb.com/2009/06/10/nokia-bundle-qik-smartphone-live-streaming/#gref Qik to be bundled with every Nokia smartphone-is live streaming about to take off? Martin Bryant, Jun. 10, 2009.

https://gigaom.com/2009/03/11/qik-pairs-with-nokias-ovi-for-live-streaming/ Qik Pairs with Nokia's Ovi for Live Streaming, Cross-Posting. Kevin C Tofel, Mar. 11, 2009.

http://www.iphonehacks.com/2009/03/skype-for-iphone-available-on-app-store-in-japan.html Skype for iPhone Available on App Store. iPhonehacks, Mar. 30, 2009.

http://phys.org/news/2009-04-skype-iphone-worth-download.html Skype on the iPhone: Worth the download Scott Kleinberg, Apr. 8, 2009.

http://mashable.com/2009/11/25/ustream-viewer-android/#JT35VeW9BGqu Ustream Launches Viewer for Android Devices Stan Schroeder, Nov. 25, 2009.

http://www.ustream.tv/blog/2009/11/25/ustream-viewer-beta-for-android-in-the-marketplace/ Ustream Viewer beta for Anriod in the Marketplace Gyula Feher, Nov. 25, 2009.

https://techcrunch.com/2010/01/28/ustream-producer-desktop/ Ustream Helps Give Your Live Broadcast A Professional Feel With New Desktop Client Jason Kincaid, Jan. 28, 2010.

http://www.iphonejd.com/iphone_jd/2009/12/review-knocking-live-video-sharing.html Review: Knockling Live—stream live video from your iPhone Jeff Richardson, Dec. 3, 2009.

(56) References Cited

OTHER PUBLICATIONS http://latimesblogs.latimes.com/technology/2009/12/ustream-video-iphone-app.html Ustream lets iPhones broadcast live and unlocks video recording for older models Mark Milian, Dec. 9, 2009.
https://techcrunch.com/2009/08/05/ustream-finally-launches-a-recording-iphone-app-No. live-video-but-a-lot-of-options/ Ustream Finally Launches A Recording iPhone App. No Live Video, But A Lot Of Options MG Siegler, Aug. 5, 2009.
https://techcrunch.com/2009/10/15/apple-announces-in-app-purchases-for-free-iphone-applications/ Apple Announces In-App Purchases for Free iPhone Applications Jason Kincaid, Oct. 15, 2009.
*Weple IP Holdings LLC v. Meta Platforms, Inc.*, Case No. 2:24-cv-01316-JLR, United States District Court for the Western District of Washington, Doc. 41, Plaintiff's Opposition to Defendant's Partial Motion to Dismiss U.S. Pat. Nos. 11,966,952, 12,131,356, and 11,734,730, Jan. 24, 2025, 31 pages.
*Weple IP Holdings LLC v. Meta Platforms, Inc.*, Case No. 2:24-cv-01316-JLR, United States District Court for the Western District of Washington, Doc. 47, Order on Defendant's Partial Motion to Dismiss U.S. Pat. Nos. 11,966,952, 12,131,356, and 11,734,730, Apr. 24, 2025, 23 pages.
*Weple IP Holdings LLC v. Meta Platforms, Inc.*, Case No. 2:24-cv-01316-JLR, United States District Court for the Western District of Washington, Doc. 38, Defendant's Partial Motion to Dismiss U.S. Pat. Nos. 11,966,952, 12,131,356, and 11,734,730, Dec. 20, 2024, 28 pages.
*Weple IP Holdings LLC v. Meta Platforms, Inc.*, Case No. 2:24-cv-01316-JLR, United States District Court for the Western District of Washington, Doc. 42, Defendant's Reply in Support of Partial Motion to Dismiss U.S. Pat. Nos. 11,966,952, 12,131,356, and 11,734,730, Feb. 7, 2025, 20 pages.
Request for Ex Parte Reexamination of U.S. Pat. No. 11,734,730, Feb. 14, 2025, 99 pages.
Declaration of Dr. Philip Greenspun, Feb. 13, 2025, 41 pages, submitted as Exhibit 1003 in support of Request for Ex Parte Reexamination of U.S. Pat. No. 11,734,730.
Choi, Jin, Design and Implementation of a Web-based Email System, Jan. 2000, 13 pages, (available at https://philip.greenspun.com/ancient-history/webmail/), submitted as Exhibit 1008 in support of Request for Ex Parte Reexamination of U.S. Pat. No. 11,734,730.
Time Code Handbook, Cipher Digital, 1986, 163 pages (available at http://bitsavers.org/test_equipment/cipher_digital/Cipher_Digital_-_Time_Code_Handbook_1987.pdf), submitted as Exhibit 1009 in support of Request for Ex Parte Reexamination of U.S. Pat. No. 11,734,730.
Berners-Lee et al., The World Wide Web, Communications of the ACM vol. 37 No. 8, Aug. 1994, 7 pages, submitted as Exhibit 1010 in support of Request for Ex Parte Reexamination of U.S. Pat. No. 11,734,730.
HTML 5: A vocabulary and associated APIs for HTML and Xhtml, W3C Working Draft dated Jan. 22, 2008, 191 pages (available at https://www.w3.org/TR/2008/WD-html5-20080122/), submitted as Exhibit 1011 in support of Request for Ex Parte Reexamination of U.S. Pat. No. 11,734,730.
Lewis, Peter H., Technology: On the Net; Will Netscape be the next Microsoft, or the next victim of Microsoft?, New York Times, Oct. 16, 1995, 3 pages (available at https://www.nytimes.com/1995/10/16/business/technology-net-will-netscape-be-next-microsoft-next-victim-microsoft.html), submitted as Exhibit 1013 in support of Request for Ex Parte Reexamination of U.S. Pat. No. 11,734,730.
Rothstein, Edward, Making the Internet come to you through 'push' technology, New York Times, Jan. 20, 1997, 4 pages (available at https://www.nytimes.com/1997/01/20/business/making-the-internet-come-to-you-through-push-technology.html), submitted as Exhibit 1014 in support of Request for Ex Parte Reexamination of U.S. Pat. No. 11,734,730.
Synchronized Multimedia Integration Language (SMIL 3.0), W3C Recommendation dated Dec. 1, 2008, 16 pages (available at https://www.w3.org/TR/SMIL/), submitted as Exhibit 1020 in support of Request for Ex Parte Reexamination of U.S. Pat. No. 11,734,730.
Elizabeth Feinler and John Vittal, Email Innovation Timeline, Computer History Museum, Jul. 1, 2022, 134 pages, submitted as Exhibit 1021 in support of Request for Ex Parte Reexamination of U.S. Pat. No. 11,734,730.
Hintz, Eric, The Mother of All Demos, Smithsonian: The Lemelson Center for the Study of Invention and Innovation, Dec. 10, 2018, 7 pages (available at https://invention.si.edu/invention-stories/mother-all-demos), submitted as Exhibit 1022 in support of Request for Ex Parte Reexamination of U.S. Pat. No. 11,734,730.
Saul Greenberg and Mark Roseman, GroupWeb: A Www Browser as Real Time Groupware, CHI Conference Apr. 13-18, 1996, 2 pages (available at https://dl.acm.org/doi/pdf/10.1145/257089.257317), submitted as Exhibit 1023 in support of Request for Ex Parte Reexamination of U.S. Pat. No. 11,734,730.
Motti, et al, Collaborative Synchronous Video Annotation via the Watch-and-Comment Paradigm, EuroITV '09, Proceedings of the 7th European Conference on Interactive TV and Video, Jun. 3-5, 2009, 10 pages, submitted as Exhibit 1024 in support of Request for Ex Parte Reexamination of U.S. Pat. No. 11,734,730.
Press Release, Apple, Apple Reinvents the Phone with iPhone, Jan. 9, 2007, 5 pages (available at https://www.apple.com/newsroom/2007/01/09Apple-Reinvents-the-Phone-with-iPhone/), submitted as Exhibit 1025 in support of Request for Ex Parte Reexamination of U.S. Pat. No. 11,734,730.

\* cited by examiner

MOBILE DEVICE STREAMING MEDIA APPLICATION

CROSS-REFERENCE TO RELATED APPLICATIONS

This application is a continuation of U.S. patent application Ser. No. 18/346,318, filed Jul. 3, 2023, which is a continuation of U.S. patent application Ser. No. 17/705,331, filed Mar. 27, 2022, which is a continuation of U.S. patent application Ser. No. 17/384,911, filed Jul. 26, 2021, which is a continuation of U.S. patent application Ser. No. 16/812, 495, filed Mar. 9, 2020, which is a continuation of U.S. patent application Ser. No. 16/790,953, filed Feb. 14, 2020, which is a continuation of U.S. patent application Ser. No. 16/157,269, filed Oct. 11, 2018, which is a continuation of U.S. patent application Ser. No. 15/273,335, filed Sep. 22, 2016, which is a continuation of U.S. patent application Ser. No. 15/041,422, filed Feb. 11, 2016, which is a continuation of U.S. patent application Ser. No. 14/512,353, filed Oct. 10, 2014, which is a continuation of U.S. patent application Ser. No. 13/967,414, filed Aug. 15, 2013, which is a continuation of U.S. patent application Ser. No. 13/027,191, filed Feb. 14, 2011, which claims priority to U.S. Provisional Patent Application No. 61/304,331, filed Feb. 12, 2010. The entireties of U.S. patent application Ser. No. 18/346,318, U.S. patent application Ser. No. 17/705,331, U.S. patent application Ser. No. 17/384,911, U.S. patent application Ser. No. 16/812,495, U.S. patent application Ser. No. 16/790,953, U.S. patent application Ser. No. 16/157,269, U.S. patent application Ser. No. 15/273,335, U.S. patent application Ser. No. 15/041,422, U.S. patent application Ser. No. 14/512, 353, U.S. patent application Ser. No. 13/967,414, U.S. patent application Ser. No. 13/027,191, and U.S. Provisional Patent Application No. 61/304,331 are hereby incorporated by reference herein.

BACKGROUND OF THE INVENTION

Streaming media is multimedia that is constantly received by and presented to an end-user while being delivered by a streaming provider. The name refers to the delivery method of the medium rather than to the medium itself. The distinction is usually applied to media that are distributed over telecommunications networks, as most other delivery systems are either inherently streaming (e.g., radio, television) or inherently non-streaming (e.g., books, video cassettes, audio CDs). The verb "to stream" is also derived from this term, meaning to deliver media in this manner Internet television is a commonly streamed medium.

Live streaming, more specifically, means taking the media and broadcasting it live over the Internet. The process involves a camera for the media, an encoder to digitize the content, a media publisher where the streams are made available to potential end-users and a content delivery network to distribute and deliver the content. The media can then be viewed by end-users live.

Consciousness is variously defined as subjective experience, awareness, the ability to experience "feeling," wakefulness, the understanding of the concept "self," or the executive control system of the mind. It is an umbrella term that may refer to a variety of mental phenomena. Although humans realize what everyday experiences are, consciousness itself resists being defined, philosophers note.

Consciousness is the subject of much research in philosophy of mind, psychology, neuroscience, cognitive science, and artificial intelligence. Issues of practical concern include how the presence of consciousness can be assessed in severely ill or comatose people; whether non-human consciousness exists and, if so, how it can be measured; at what point in fetal development consciousness begins; and whether computers can achieve a conscious state.

Prayer is a form of religious practice that seeks to activate a volitional rapport to a god or spirit through deliberate practice. Prayer may be either individual or communal and take place in public or in private.

It may involve the use of words or song. When language is used, prayer may take the form of a hymn, incantation, formal creedal statement, or a spontaneous utterance in the praying person. There are different forms of prayer such as petitionary prayers, prayers of supplication, thanksgiving, and worship/praise.

Prayer may be directed towards a deity, spirit, deceased person, or lofty idea, for the purpose of worshipping, requesting guidance, requesting assistance, confessing sins, or to express one's thoughts and emotions. Thus, people pray for many reasons such as personal benefit or for the sake of others.

Most major religions involve prayer in one way or another. Some ritualize the act of prayer, requiring a strict sequence of actions or placing a restriction on who is permitted to pray, while others teach that prayer may be practiced spontaneously by anyone at any time.

SUMMARY OF THE INVENTION

In one embodiment according to the present invention, a system and process for coordinating a programmed media stream is provided. Preferably, this content relates to consciousness messages such as prayers, requests for charity, thoughts, or similar messages. However, this content can also relate to breaking news, music videos, comedy, or similar content. A network-connected server maintains a database containing media content-related data, such as the text of a message, accompanying media, time of airing, payment, and related comments. A user can view these feeds or streams of these streams by downloading a mobile application or browsing to a website. The application or website can also be used to create, schedule, and pay for media content airtime for a message or program.

BRIEF DESCRIPTION OF THE DRAWINGS

These and other aspects, features, and advantages of which embodiments of the invention are capable of will be apparent and elucidated from the following description of embodiments of the present invention, reference being made to the accompanying drawings, in which.

DESCRIPTION OF EMBODIMENTS

Figure 1:
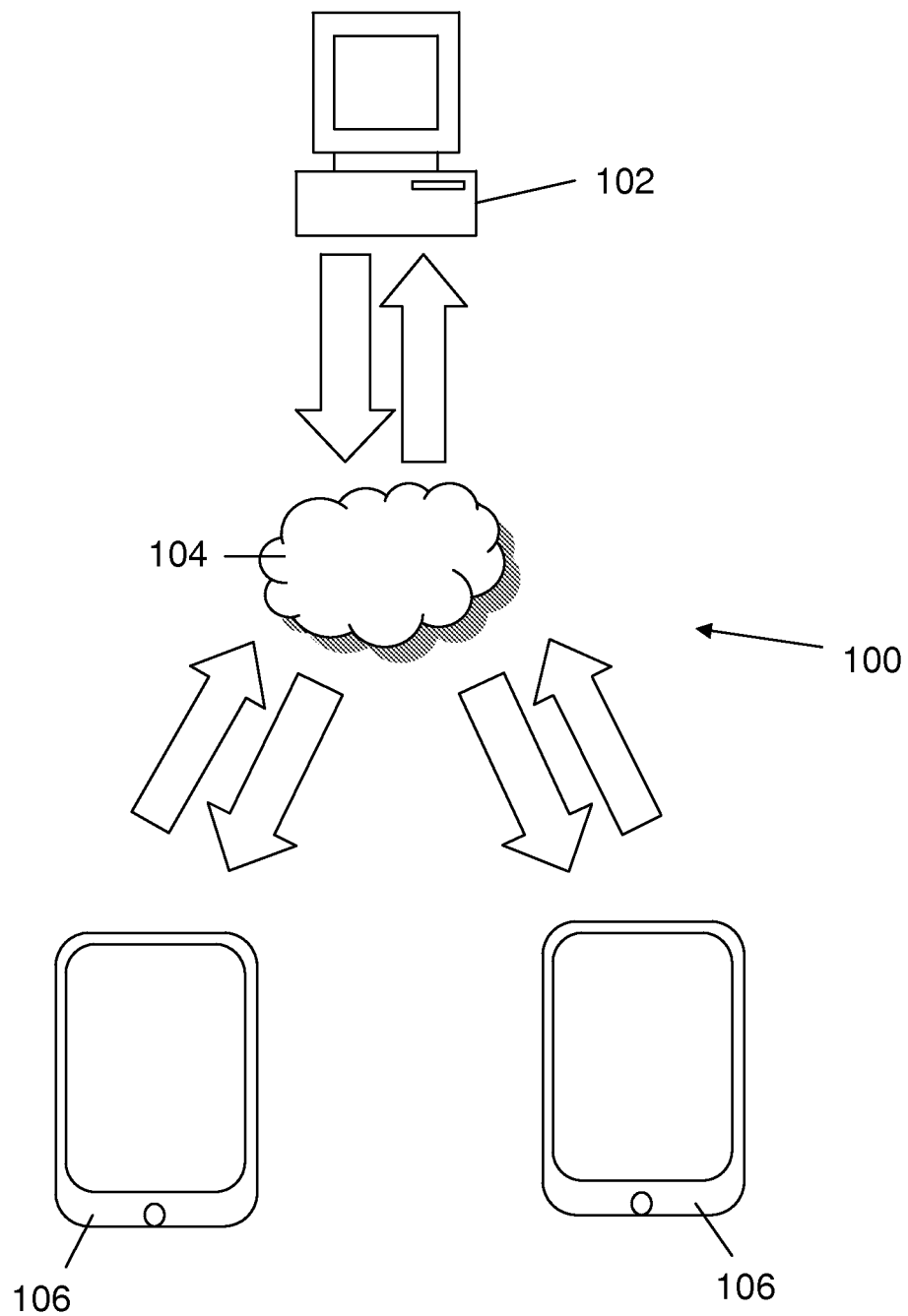
FIG. 1 illustrates a media content coordination system according to an embodiment of the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terms message, media message, or program are used interchangeably in this specification and generally refer to text, audio, video, or still images sent across the internet. In one aspect of the present invention, the system can be used for any media content type, such as news, comedy, drama, environmental messages, offers to purchase related items, and similar messages. In another aspect of the present invention, the system is used for consciousness messages, such as prayers, collective thoughts, appeals to charity, and inspirational messages.

FIG. 1 illustrates an example media coordination system 100 according to the present invention which allows network connected devices, such as mobile devices 106 (cell phones, portable music players, tables, laptops, etc.), to coordinate times for specific media messages/programs to be streamed to other application users (e.g., a feed of message posts or a stream of real-time media data). Generally, a computer server 102 (e.g., a processor, RAM, a hard drive, an operating system, web serving software and database software) is connected to a wide area network 104 such as the internet or wireless cell phone data network. Mobile devices 106 are also connected to the network 104, allowing for communication to and from the server 102.

Figure 13:
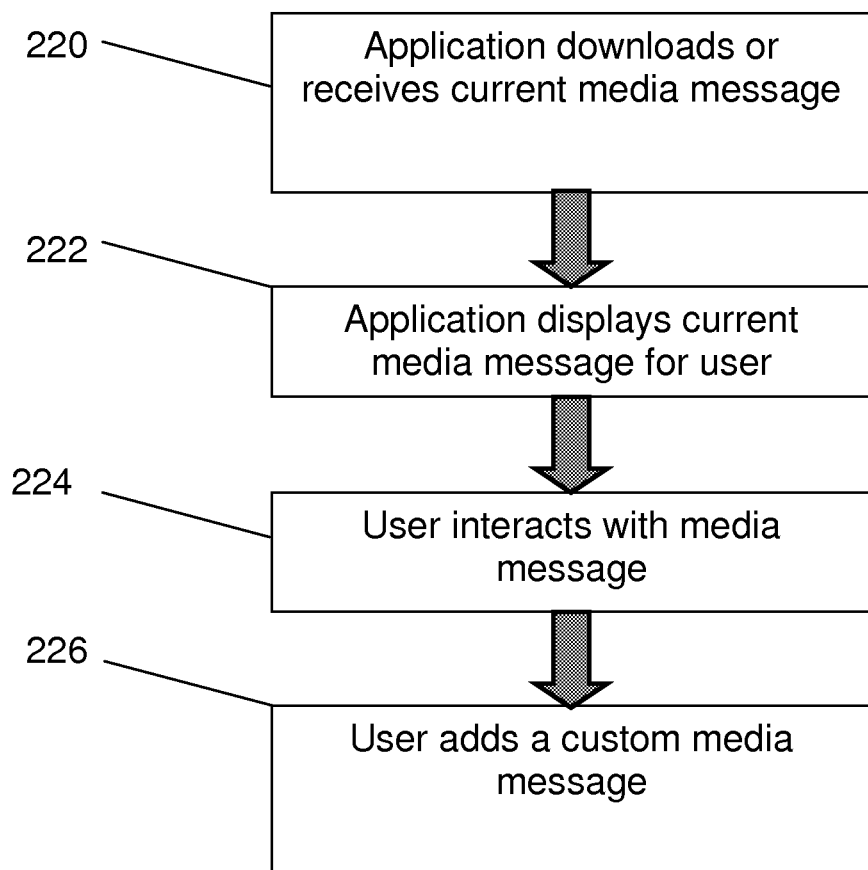
FIG. 13 illustrates a process of viewing and interacting with a current message according to an embodiment of the present invention; and, FIG. 14 illustrates an interface for in app purchases of items according to an embodiment of the present invention.

As seen in item 220 of the flow chart of FIG. 13, a user either executes the mobile media application on their mobile device or uses a browser to browse to an internet page supplied by the server 102. The application downloads the current media message/program (i.e., a thought or prayer video scheduled for airing at that time) from the server. Alternately, the server 102 may automatically push the current media message or link to the current media message via phone notifications, email, or text messages.

In one example, delivery of the current media message to the mobile device 106 is performed as a feed that is downloaded as requested by the user. In another example, delivery of the current media message is achieved with a live streaming media file (e.g., streaming audio/video) that provides images, text, and/or audio to the user's mobile device. In this respect, the media message stream is similar to a live television station having scheduled media messages as its programming.

In item 222, the mobile application displays the media message data supplied by the server 102. This data may include the text of a media message, an attached or linked-to media file, donation information, and media message expiration information (i.e., when the current media message expires causing the mobile application to download a new current media message). Alternately, the media message data may be a live media stream, previously rendered by the server 102, which displays the images, text, audio, video, or other items in a common media format (e.g., h.264 mp4 video format). In one preferred embodiment, the media message is a prayer, collective consciousness message, request for charity, environmental, or similar message.

In item 224, the user views the media message data in an interface of the mobile application and interacts with the interface. For example, the user may add a comment about the media message, a donation, a greeting card, or share a link to the media message via a social network, email, text message, or similar communication. The user may also make purchases within the application (e.g., in app purchases, credit cards, Pay Pal, etc.) to buy gift certificates for message airtime, greeting cards, or similar in-application items.

In item 226, the user can design, upload, and pay for a custom media message that is stored and aired from the server 102. The server will similarly air the custom media message at the specified time as the current media message, thereby distributing that media message out to other users of the mobile application and website.

Figure 10:
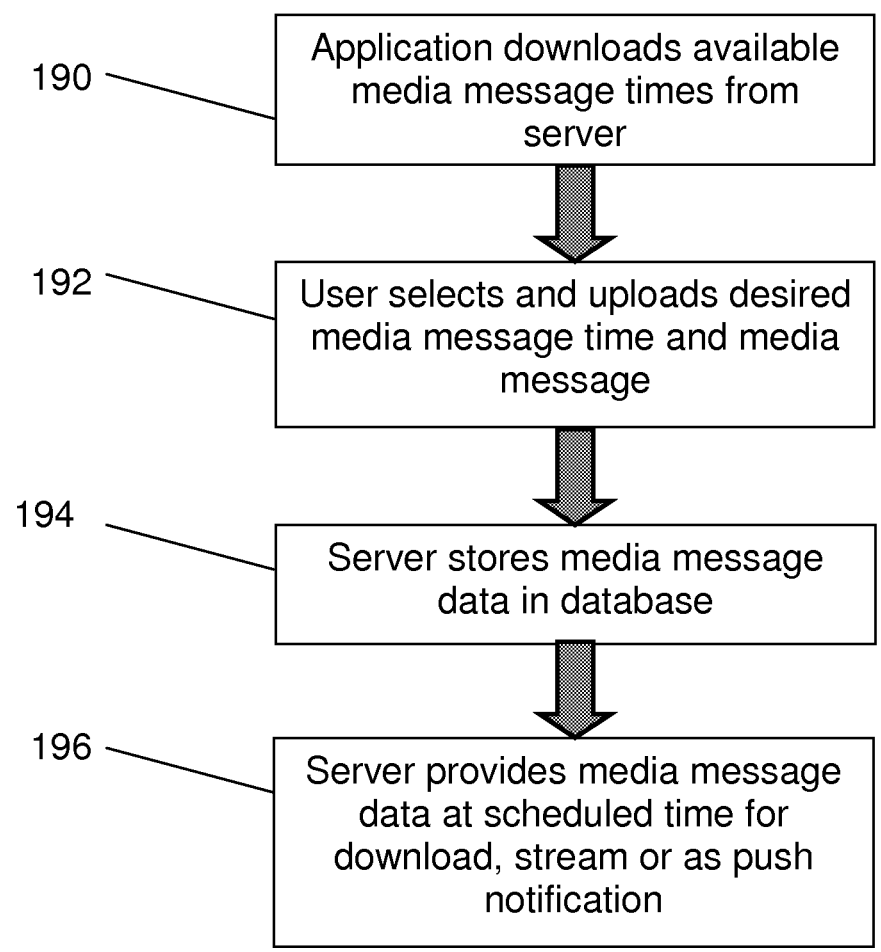
FIG. 10 illustrates a process of coordinating media content times according to an embodiment of the present invention.

FIG. 10 illustrates a flow chart of an example process for coordinating media messages. As seen in item 190, the mobile application is executed on the mobile device 106 that can download available times that a media message can be scheduled. A user can request availability of a specific time or the mobile application can download a variety of free times.

In item 192, the user selects a time that they would like to have their media message available, the text of their media message, any images, or videos that they would like to accompany the media message, and payment information. This data is uploaded to server 102 and stored in a database in item 194.

As seen in item 196, the sever 102 provides media message data according to the scheduled time. This data can be rendered and streamed as a live streaming format, made available for download to each mobile device 106 running the application or can be sent out via a push notification, email, or text message. Optionally, the push notification, email, or text message can include a link that opens the mobile media message application to that specific media message or to a webpage displaying that media message.

The current media message can also be displayed on any participating websites. For example, an otherwise nonaffiliated website could include code that displays the current media message. In another example, the media message can be posted to a social media site, such as Facebook or Twitter, which allows users to subscribe. In this respect, people visiting websites otherwise unrelated to the server 102 can also view the current media message.

Figure 2:
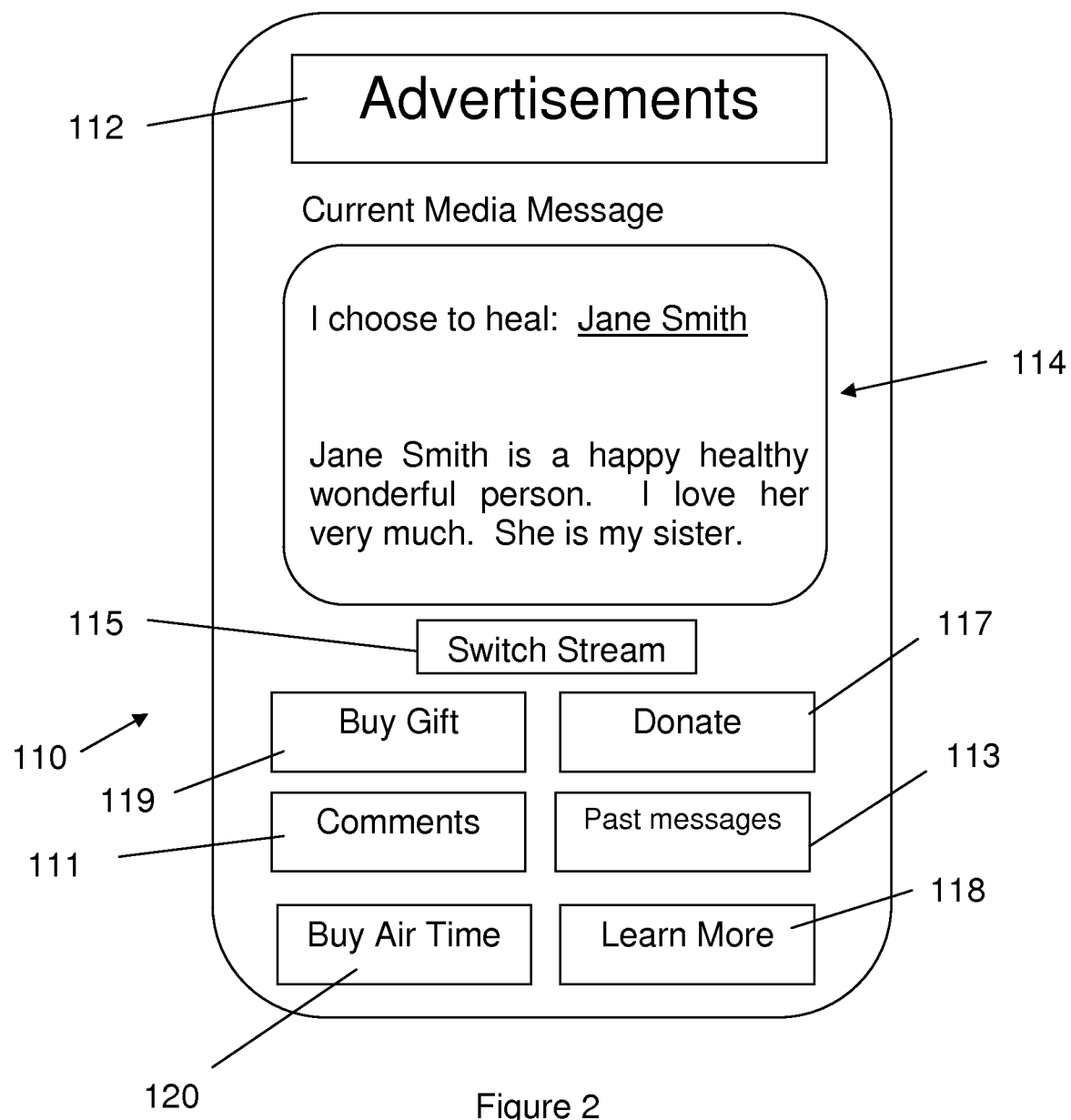
FIG. 2 illustrates a current media content interface according to an embodiment of the present invention.
Figure 3:
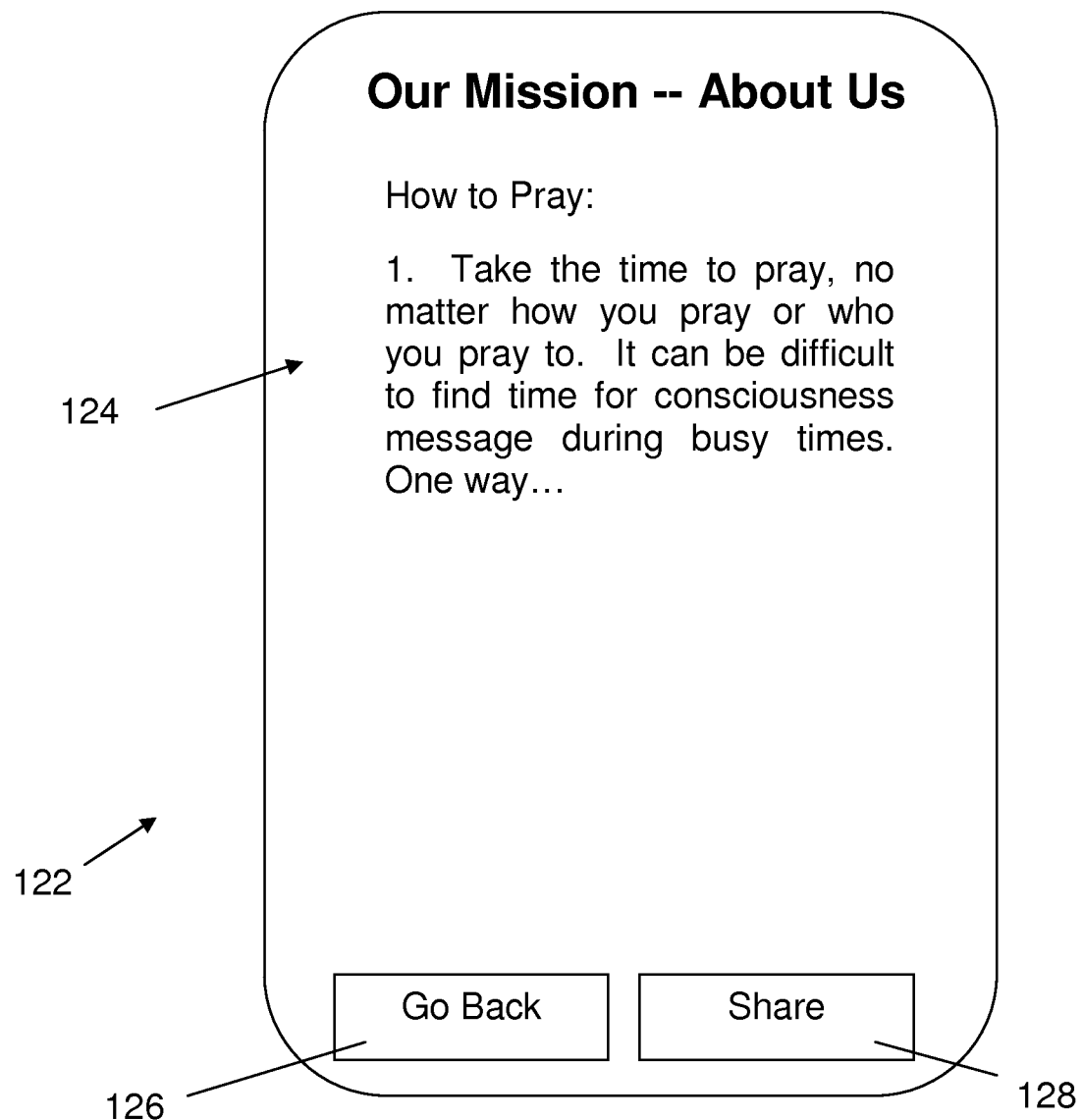
FIG. 3 illustrates an about us interface according to an embodiment of the present invention.

FIGS. 2-9 illustrate various example aspects and interfaces of the mobile media message application according to the present invention. FIG. 2 illustrates the current media message interface 110 that displays the media message currently scheduled by the server 102. The current media message interface 110 preferably includes a media message text display 114 that displays the text of the media message specified by the person who created the current media message.

Optionally, the current media message interface includes an advertisement banner 112 for displaying advertisements from a downloaded source, such as from Google AdSense or Apple in-app advertising. Optionally, the mobile media message application can allow a user the option to include this banner 112 during the media message creation process to financially subsidize the price of posting the media message.

The interface 110 also includes a comments button 111 that displays a comment interface for leaving messages related to the current media message. A past media messages button 113 is also included for displaying a list of past media messages or bookmarked media messages.

Preferably, multiple feeds or streams are available to the mobile application. For example, some streams can be specific breaking news, religion, music, or pets. Selecting the switch stream button 115 allows the user to switch between these streams.

The donate button 117 allows the user to donate money to originator of the media message, thereby allowing users or entities to raise money in addition to soliciting media messages. The buy gift button 119 allows the user to buy items for the author of the current message or another user. Gifts can include virtual greeting cards, gift certificates, message airtime, and similar items. The buy airtime button 120 displays an interface for creating and purchasing a media message that will be displayed on the application and the learn more button 118 displays an about us interface 122 seen in FIG. 3.

The about us interface 122 preferably includes information about the developer and information 124 about how to pray. A share button 128 allows the user to share specific media message tips with others (e.g., by emailing text of the media message information 124). The go back button 126 returns the user to the previous screen.

Figure 4:
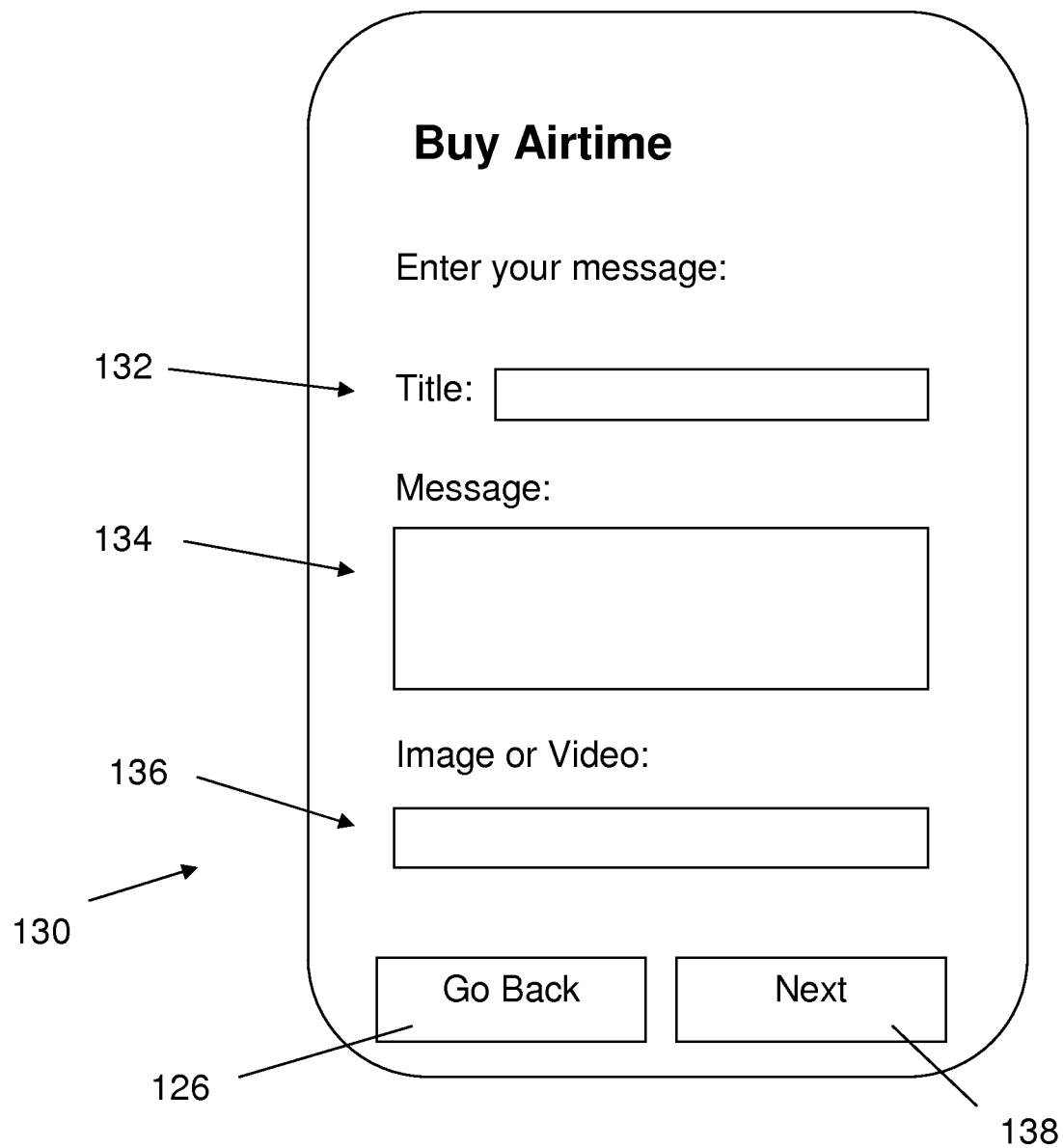
FIG. 4 illustrates an airtime purchase interface according to an embodiment of the present invention.
Figure 5:
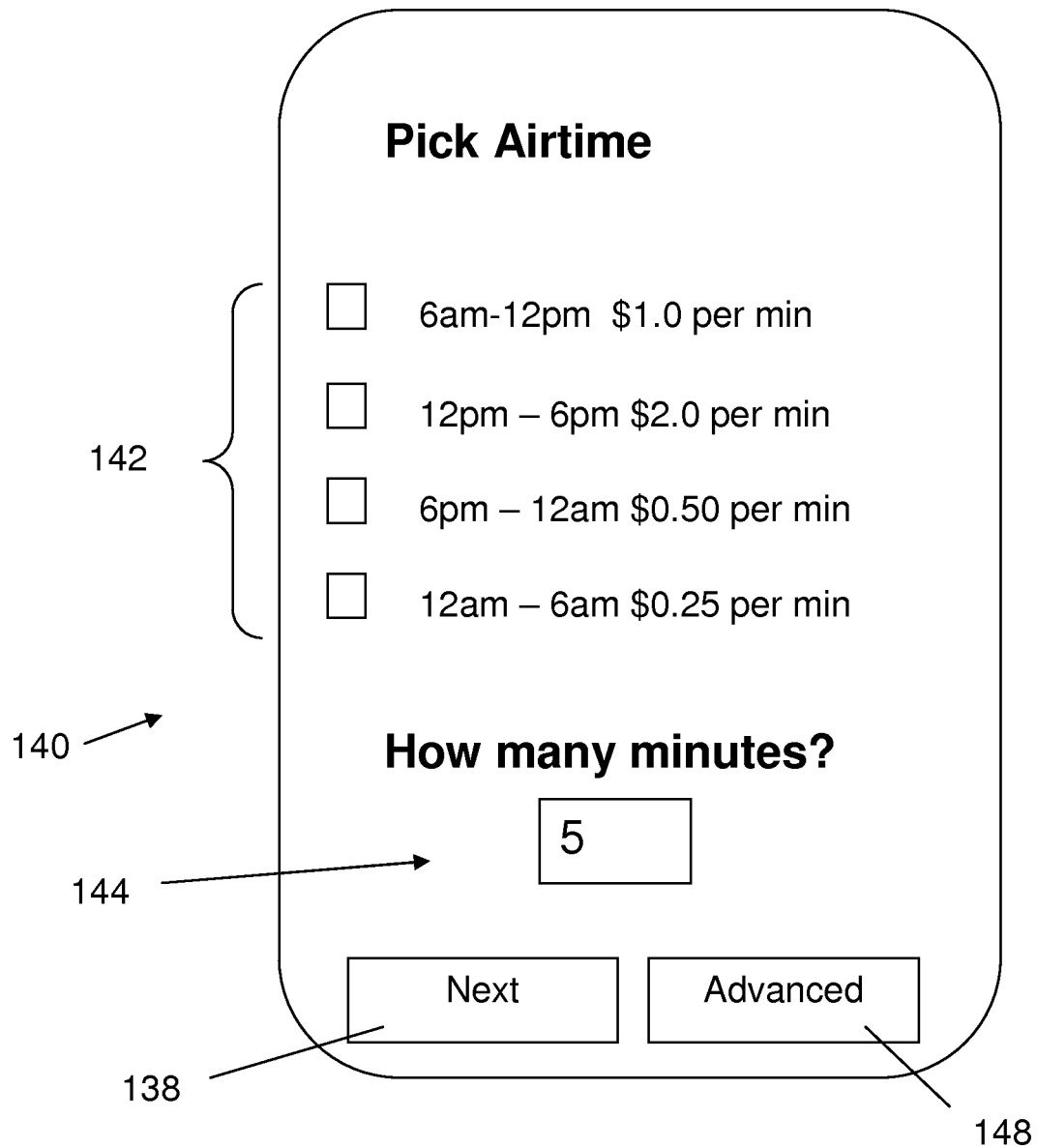
FIG. 5 illustrates an airtime date selection interface according to an embodiment of the present invention.
Figure 6:
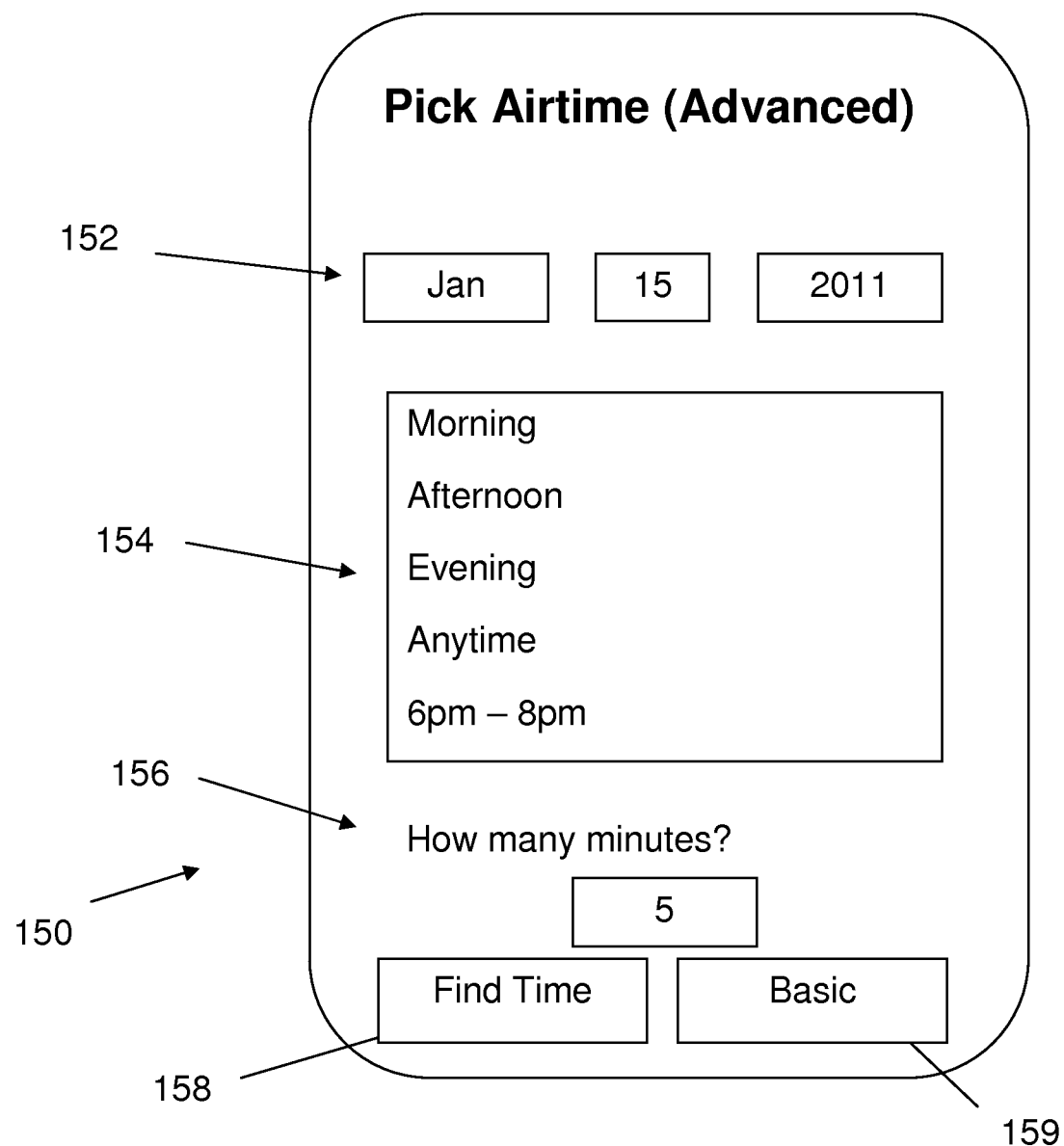
FIG. 6 illustrates an advanced airtime date selection interface according to an embodiment of the present invention.

If the user selects the buy airtime button 120 in interface 110, the buy airtime interface 130 is displayed, as seen in FIG. 4. Title input 132 allows a user to enter a text title for their media message, while text of the media message can be entered in message input 134. Optionally, the user can attach or add a link to an image, audio, and/or video in the media input 136. This media is uploaded to the server 102 and rendered into the stream for broadcast at the scheduled time. The next button 138 displays the airtime selection interface 140 as seen in FIG. 5.

The airtime selection interface 140 preferably provides a plurality of selectable time ranges 142 (e.g., check boxes) and their accompanying cost. A minute input 144 allows the user to specify the amount of time the user would like their media message to be displayed as the current media message. Selecting the advanced button 148 displays the advanced airtime interface 150 seen in FIG. 6.

The advanced airtime interface 150 allows the user more control over exactly when the media message will be shown as the current media message. For example, a date interface 152 allows the user to specify a specific day to air the media message, the time interface 154 provides more detailed time ranges, and the time interface allows input of the amount of time the media message will air as the current media message. Selecting the basic button 159 returns the user to the airtime selection interface 140 while selecting the find time button 158 attempts to find an unreserved free time for the media message.

Figure 7:
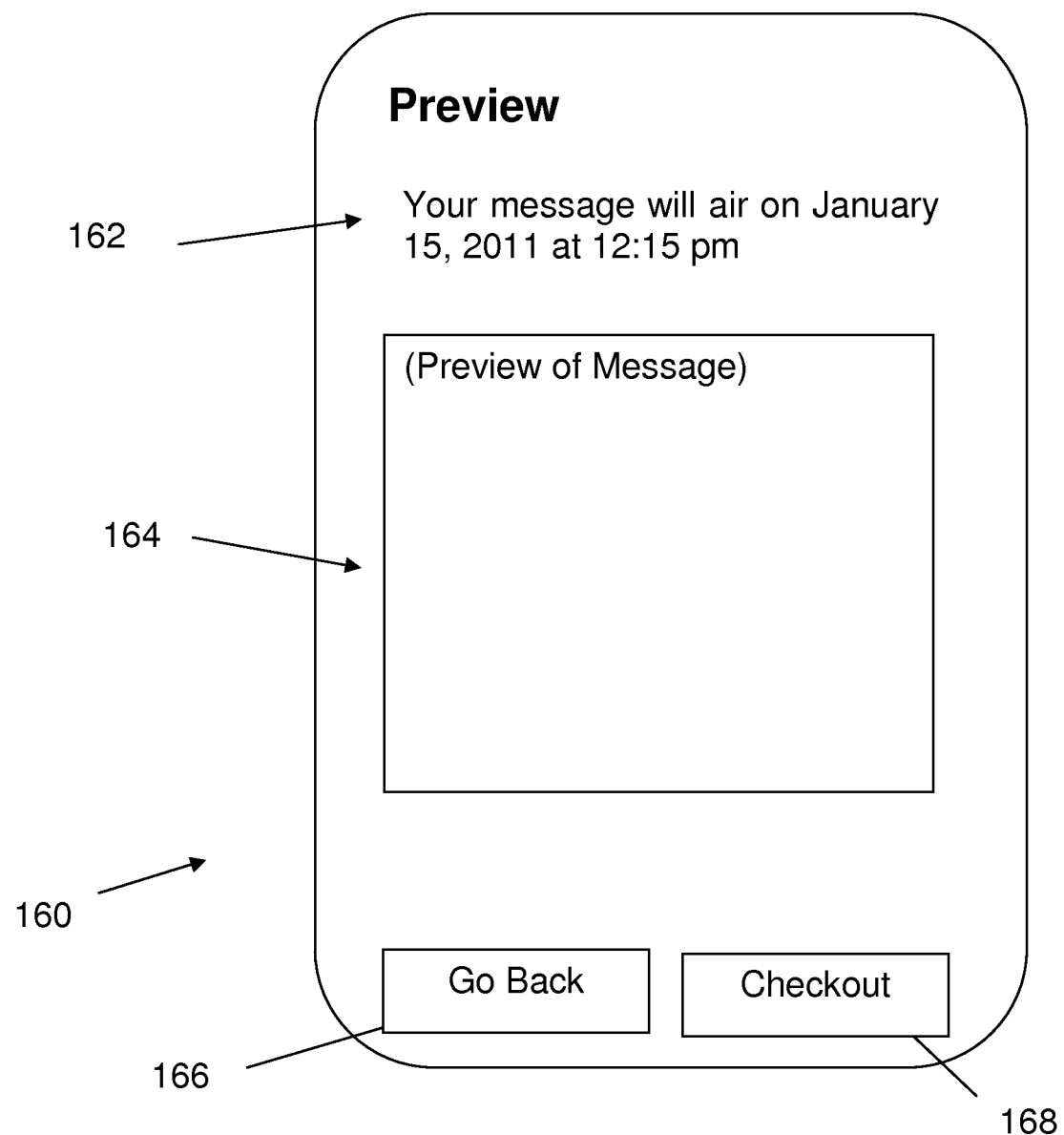
FIG. 7 illustrates a media content preview interface according to an embodiment of the present invention.
Figure 8:
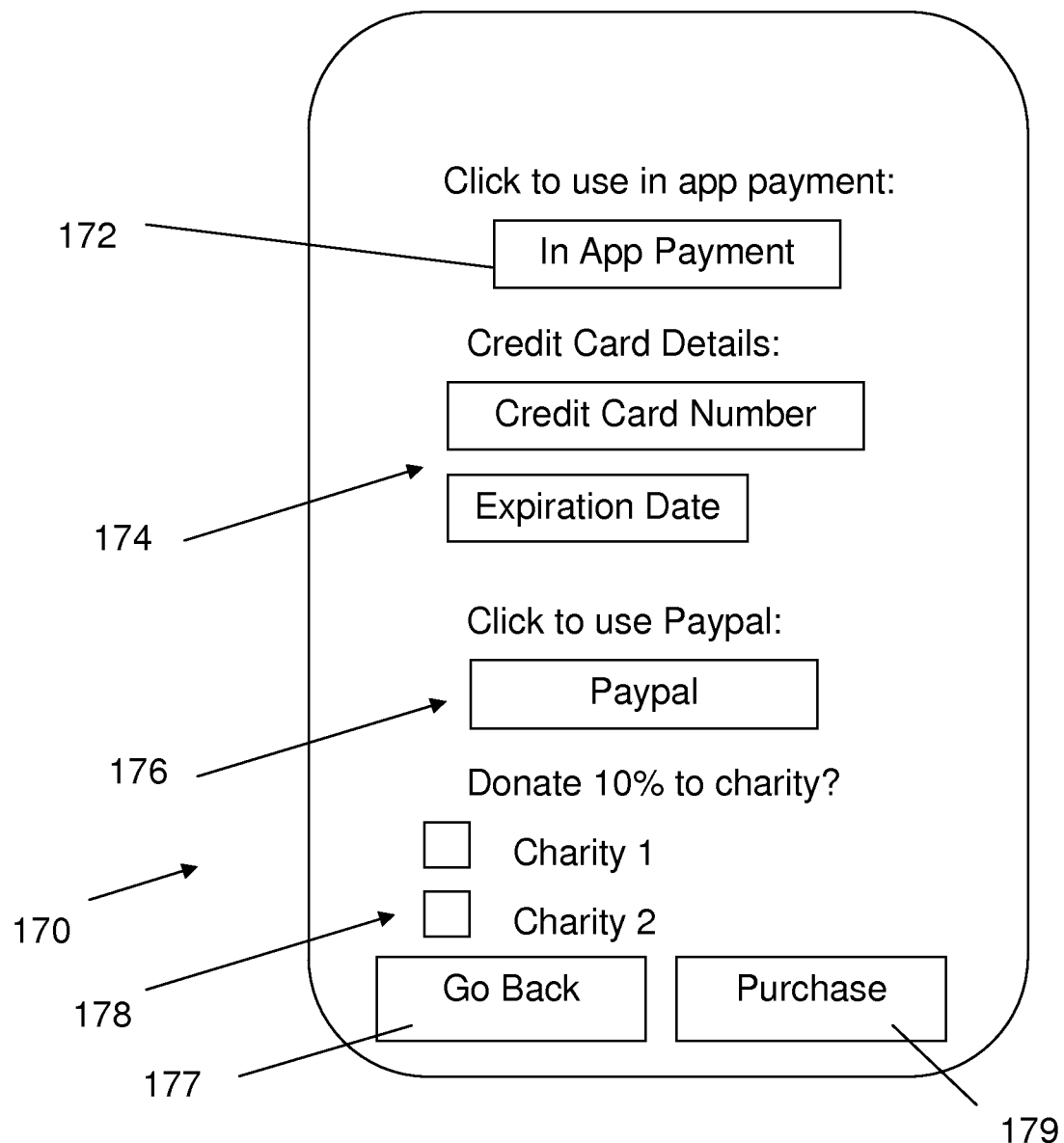
FIG. 8 illustrates a payment interface according to an embodiment of the present invention.

Once the server 102 has found a free time according to the criteria selected by the user, the preview interface 160 is displayed, as seen in FIG. 7. The proposed message date 162 is located at the top of the interface 160, followed by the preview of the media message 164. The user can select the go back button 166 to return to a previous interface to correct information or can select the checkout button 168 to display the payment interface 170, seen in FIG. 8.

The payment interface 170 allows the user to select their desired method of payment. This interface can be used for buying airtime on a stream or for any other activity that may require payment (e.g., purchasing gift certificates or greeting cards).

For example, the user can select the in-app payment button 172 to cause payment through an "in-app" payment system, such as Apple's in-app payment system. The user may also enter their credit card information in the credit card input 174 or can select the PayPal button 176 to bring up PayPal login credentials for payment via PayPal. Preferably, the interface 170 includes a plurality of charity inputs 178 (e.g., checkboxes) for specifying donations to specific charities. The user can return to previous interfaces via the go back button 177 or can submit the payment information via the purchase button 179.

Figure 9:
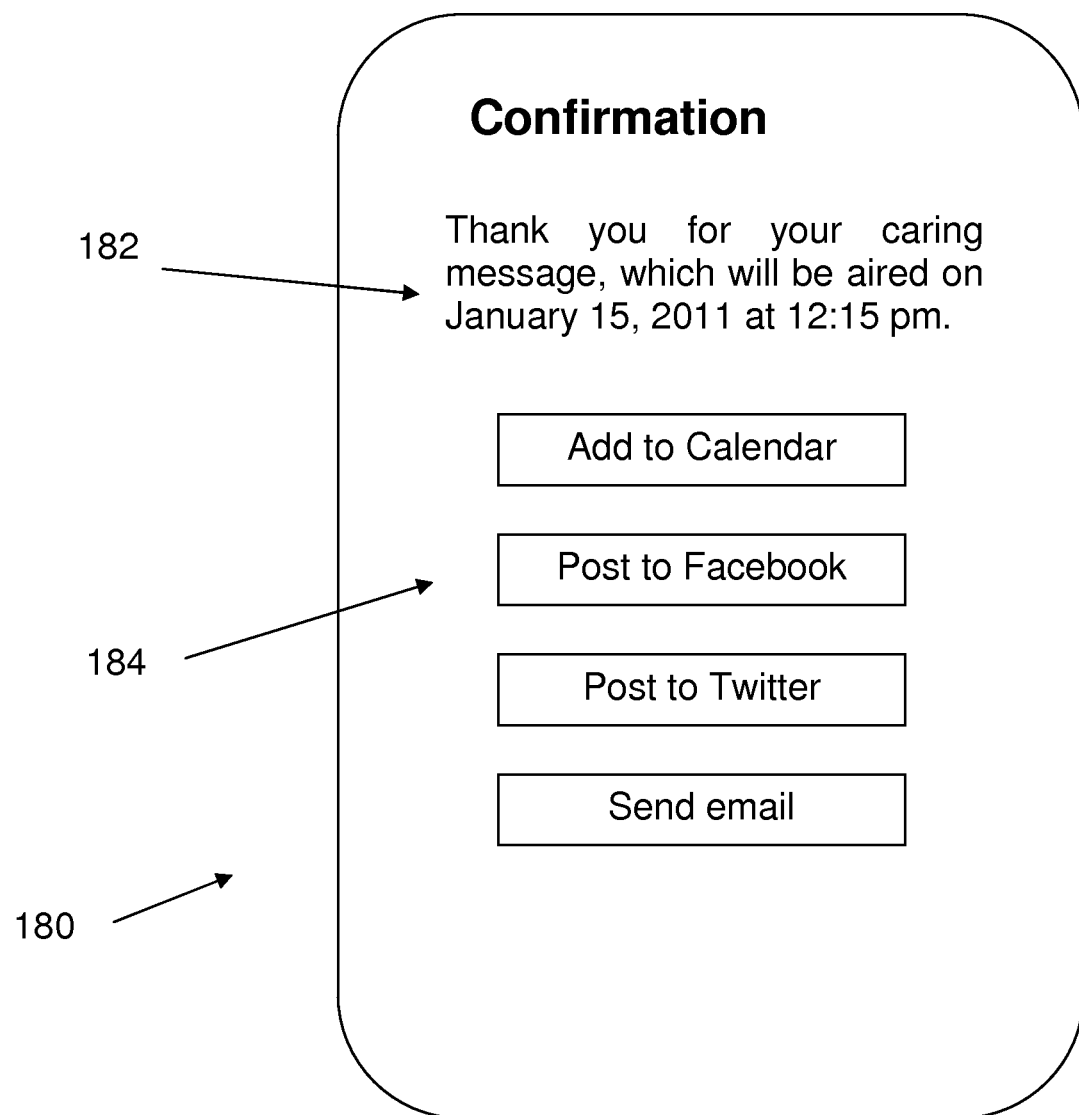
FIG. 9 illustrates a confirmation interface according to an embodiment of the present invention.

Once the payment information has been submitted and confirmed by the server 102, the confirmation interface 180 is displayed, as seen in FIG. 9. A confirmation message 182 is displayed at the top of the interface 180 to confirm the exact time the media message will be available. Additionally, a plurality of media message sharing buttons 184 are displayed to allow the user to easily share details (e.g., date, time, hypertext link) to the media message on various calendar, email, text message, or social media websites.

Figure 11:
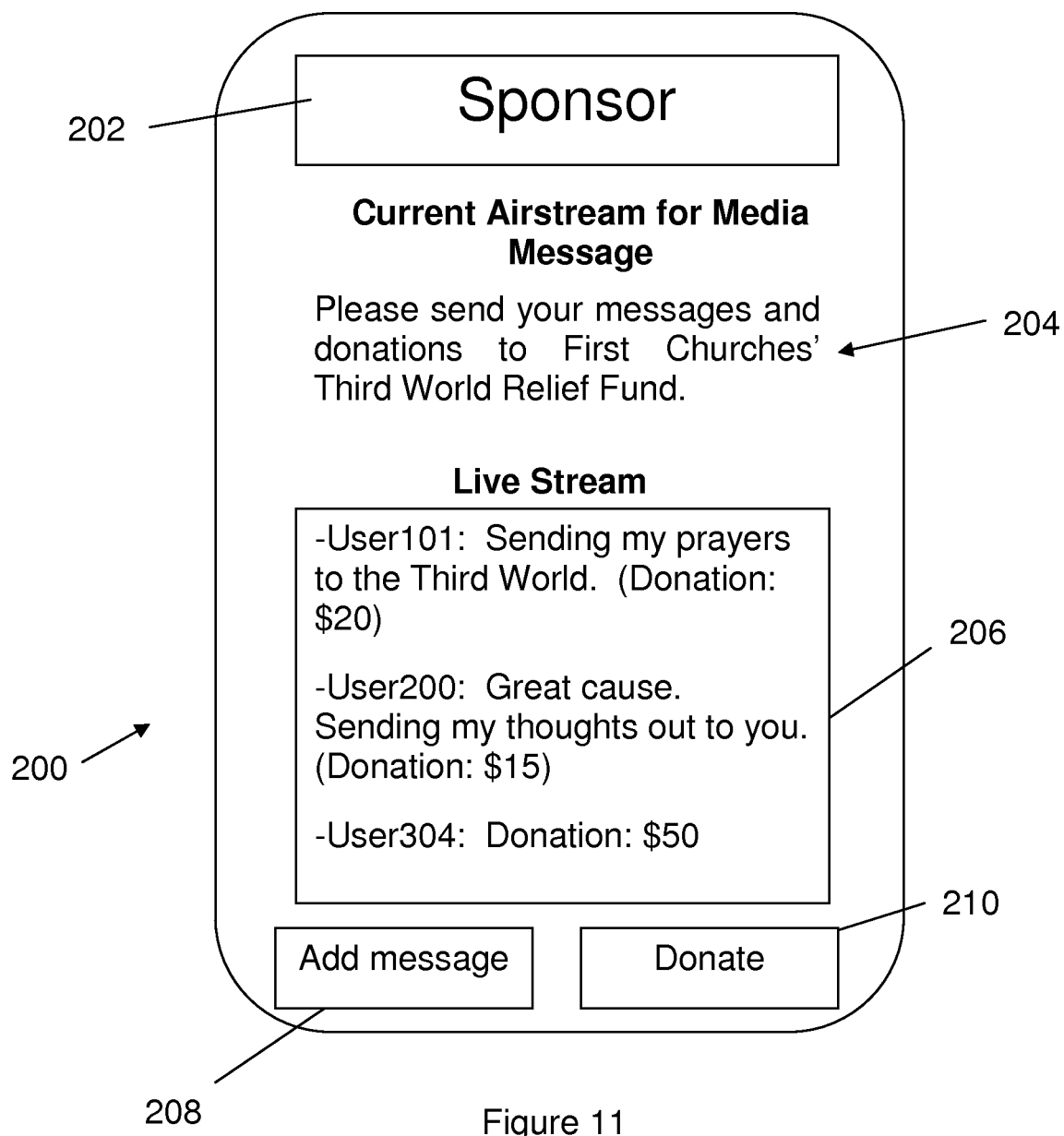
FIG. 11 illustrates a media content airstream interface according to an embodiment of the present invention.

FIG. 11 illustrates an alternate media message interface 200 according to the present invention. The interface 200 allows a user or organization to post a media message, media (music, video, image, etc.), and/or request for donations, seen in the media message display 204. This airstream media message can be purchased through an interface similar to those previously described in this specification. Optionally, an advertiser may sponsor such a stream and post their ad banner in the banner display 202.

The interface 200 also displays live or regularly updated comments and media messages from users in the live stream display 206. If a user wishes to comment, add a greeting card (or similar link), or add a message, the add message button 208 can be selected, prompting the user for a text comments and an optional donation amount. Alternately, the user can select the donate button 210 to donate money without adding a comment (e.g., utilizing the payment interface 170). These comments and donation amounts are transmitted to the server 102, processed, and then displayed in the live stream display 206 for all users to view.

Figure 12:
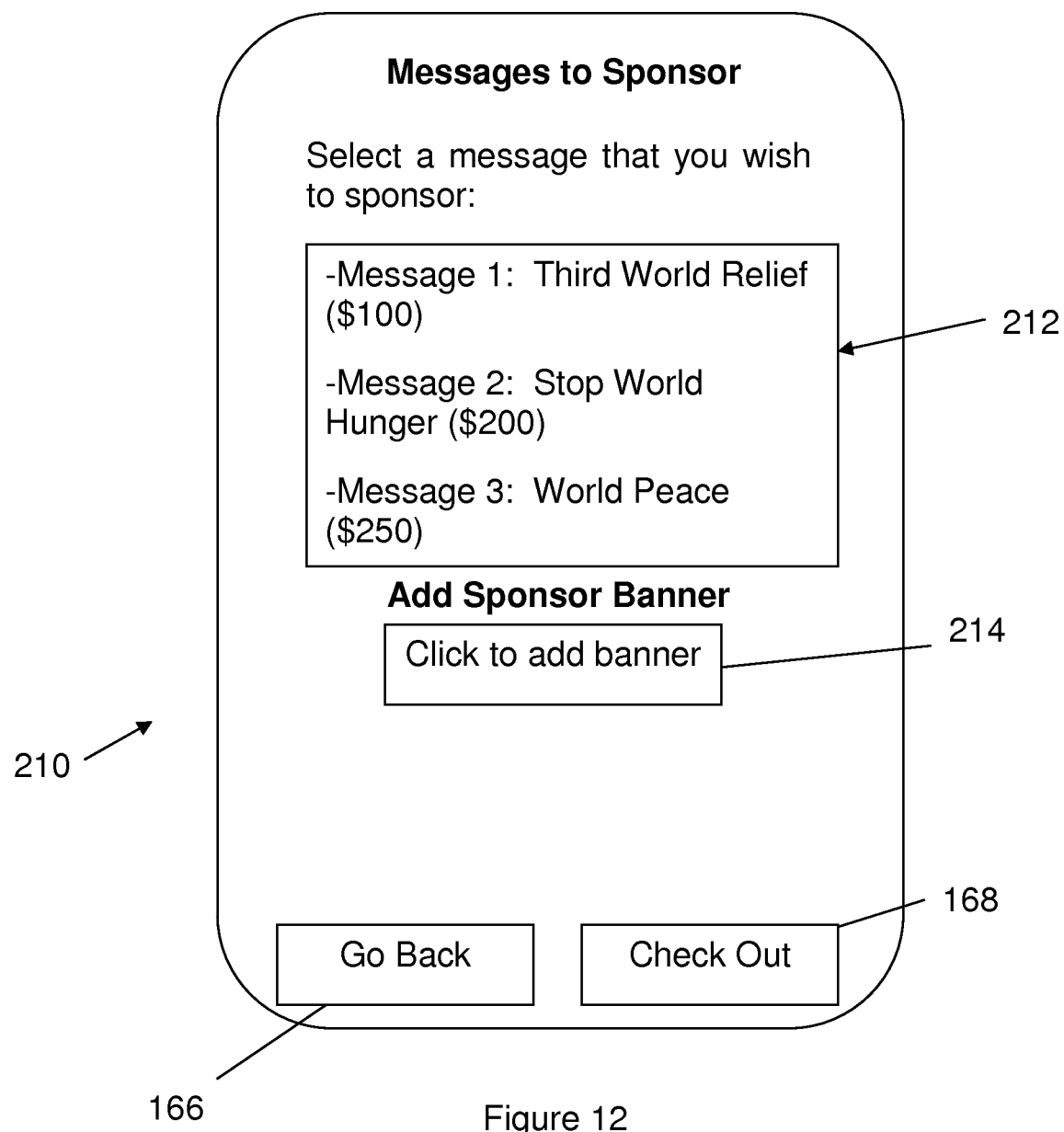
FIG. 12 illustrates a media content sponsorship interface according to an embodiment of the present invention.

FIG. 12 illustrates a sponsor interface 210 that allows an advertiser or user to sponsor a specific current media message or airstream media message. A media message selection input 212 downloads and displays from the server 102 a list of media messages and sponsor prices that are available for sponsorship. A specific media message can be selected and the sponsor's ad banner can be uploaded to the server 102 by clicking the add banner button 214. Once the user is satisfied by their selection, the check out button 168 can be used to pay.

Figure 14:
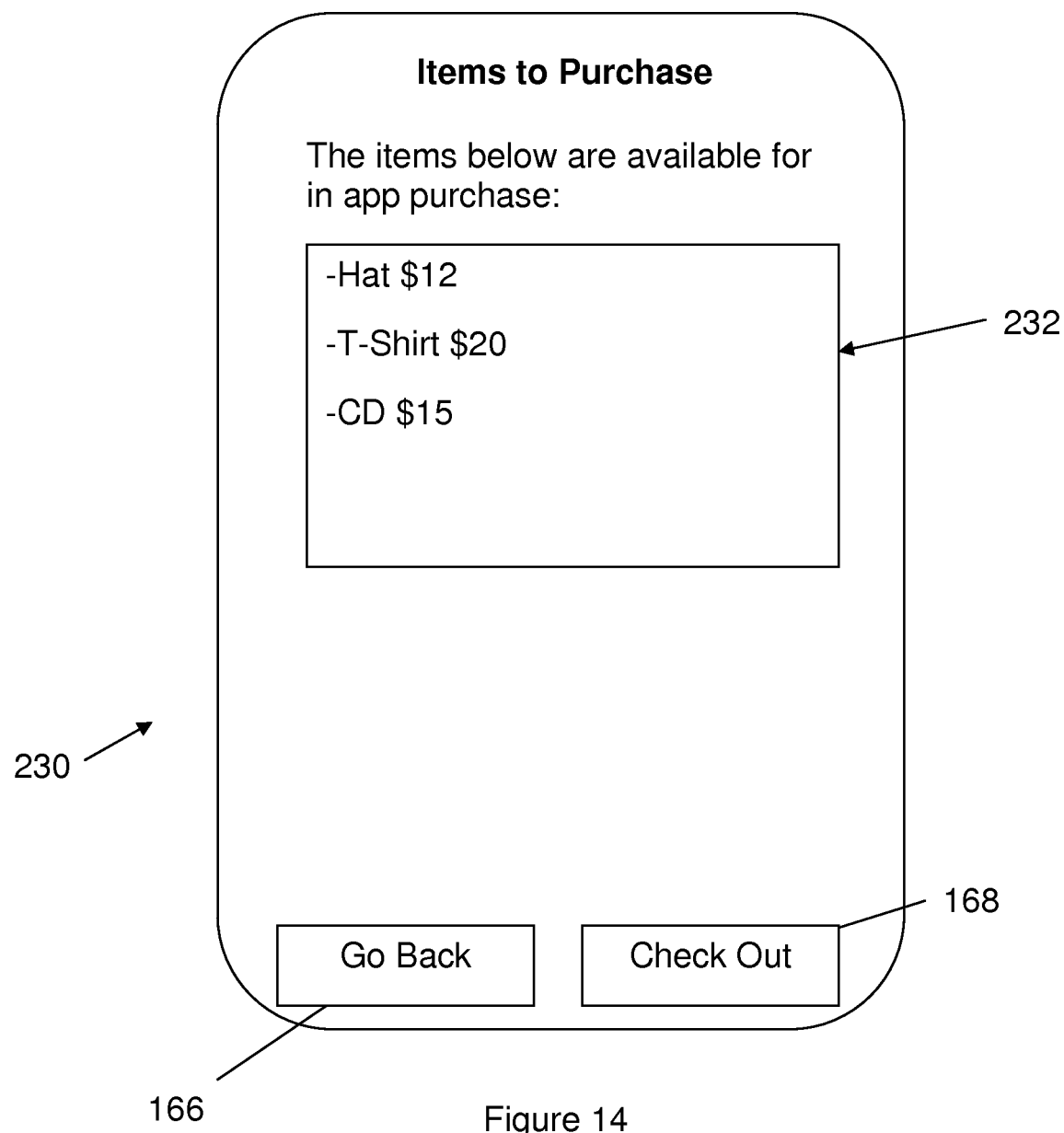

FIG. 14 illustrates an item purchase interface 230 that allows the user to make in-app purchases of items via the item selection interface 232. This allows the user to select a desired item (real or virtual) for purchase, then select the check out button 168, which leads to the previously described payment interface 170.

In one specific example, the present invention can be particularly used to facilitate prayer or collective consciousness. For example, users can purchase airtime to display a prayer or collective thought. In another example, a request for donations (e.g., from a person or charity) can be uploaded to the stream to allow users to donate money within the mobile application.

In another specific example, the present invention can be used to purchase airtime and upload ongoing news or informational video. In this respect, a stream may be directed to eye-witness news or similar breaking new.

In another specific example, a stream can be directed to music videos. Hence, a user can purchase airtime and upload their own music videos that will stream at a specific time and date.

In another example, a stream can be directed to short films. Users can produce their own films, purchase airtime, and then upload the films to air on the channel at a specific time.

In another example according to the present invention, the server can provide a user or company with their own media stream to control. In this respect, the other users can post messages on this third party controlled stream, allowing the stream creator to designate airtime price, which uploads are approved and additional items for purchase.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method, comprising:
receiving, at one or more servers, a plurality of media messages from one or more mobile applications executable on a corresponding one or more mobile devices;
storing the plurality of media messages on the one or more servers;
selecting, for inclusion in a feed, a subset of media messages from among the plurality of media messages stored on the one or more servers; and
providing the feed from the one or more servers to a mobile application executable on a mobile device, the mobile application configured to present the feed, wherein presentation of the feed by the mobile application includes presentation of an advertisement, an item purchase prompt, a comment prompt, and a sharing prompt with a media message included in the feed, wherein interaction with the item purchase prompt via the mobile application enables a purchase of an item via the mobile application, wherein interaction with the comment prompt via the mobile application enables a comment to be associated with the media message, and wherein interaction with the sharing prompt via the mobile application facilitates generation of a link configured to enable access to the media message.

2. The method of claim 1, wherein respective ones of the plurality of media messages received at the one or more servers include an image or video captured by the one or more mobile applications via a corresponding one or more cameras of the corresponding one or more mobile devices.

3. The method of claim 2, wherein the media message included in the feed includes one or more of an attached image or attached audio that is not native to the image or video captured by the one or more mobile applications via the corresponding one or more cameras of the corresponding one or more mobile devices.

4. The method of claim 1, wherein interaction with the advertisement via the mobile application initiates presentation of additional advertising content.

5. The method of claim 1, wherein the feed is a first feed and the subset of media messages is a first subset of media messages, the method further comprising:
selecting, for inclusion in a second feed, a second subset of media messages from among the plurality of media messages stored on the one or more servers, the second feed differing from the first feed; and
providing the second feed from the one or more servers to the mobile application, the mobile application configured to present the second feed, wherein the mobile application is further configured to switch a presentation of the first feed to a presentation of the second feed in response to a user interaction with the mobile application.

6. The method of claim 1, wherein the feed is a first feed and the subset of media messages is a first subset of media messages, and wherein the mobile application is a first mobile application executable on a first mobile device, the method further comprising:
selecting, for inclusion in a second feed, a second subset of media messages from among the plurality of media messages stored on the one or more servers, the second feed differing from the first feed; and
providing the second feed from the one or more servers to a second mobile application executable on a second mobile device, the second mobile application configured to present the second feed.

7. The method of claim 1, wherein a media message from among the plurality of media messages stored on the one or more servers is associated with a scheduled airtime that determines when the media message is available for presentation, wherein selecting the subset of media messages for inclusion in the feed is based on the scheduled airtime, and wherein the media message is not selected as part of the subset of media messages for inclusion in the feed prior to the scheduled airtime.

8. A method, comprising:
generating a plurality of media messages at one or more mobile applications executable on a corresponding one or more mobile devices, wherein respective ones of the plurality of media messages include an image or video captured by the one or more mobile applications via a corresponding one or more cameras of the corresponding one or more mobile devices;
receiving, at one or more servers, the plurality of media messages from the one or more mobile applications;
storing the plurality of media messages on the one or more servers;

selecting, for inclusion in a feed, a subset of media messages from among the plurality of media messages stored on the one or more servers; and providing the feed from the one or more servers to a mobile application executable on a mobile device, the mobile application configured to present the feed, wherein presentation of the feed by the mobile application includes presentation of an advertisement, an item purchase prompt, a comment prompt, and a sharing prompt with a media message included in the feed, wherein interaction with the item purchase prompt via the mobile application enables a purchase of an item via the mobile application, wherein interaction with the comment prompt via the mobile application enables a comment to be associated with the media message, and wherein interaction with the sharing prompt via the mobile application facilitates generation of a link configured to enable access to the media message.

9. The method of claim 8, wherein interaction with the advertisement via the mobile application initiates presentation of additional advertising content.

10. The method of claim 8, wherein the media message included in the feed includes one or more of an attached image or attached audio that is not native to the image or video captured by the one or more mobile applications via the corresponding one or more cameras of the corresponding one or more mobile devices.

11. The method of claim 8, wherein the feed is a first feed and the subset of media messages is a first subset of media messages, the method further comprising:
    selecting, for inclusion in a second feed, a second subset of media messages from among the plurality of media messages stored on the one or more servers, the second feed differing from the first feed; and
    providing the second feed from the one or more servers to the mobile application, the mobile application configured to present the second feed, wherein the mobile application is further configured to switch a presentation of the first feed to a presentation of the second feed in response to a user interaction with the mobile application.

12. The method of claim 8, wherein the feed is a first feed and the subset of media messages is a first subset of media messages, and wherein the mobile application is a first mobile application executable on a first mobile device, the method further comprising:
    selecting, for inclusion in a second feed, a second subset of media messages from among the plurality of media messages stored on the one or more servers, the second feed differing from the first feed; and
    providing the second feed from the one or more servers to a second mobile application executable on a second mobile device, the second mobile application configured to present the second feed.

13. The method of claim 8, wherein a media message from among the plurality of media messages stored on the one or more servers is associated with a scheduled airtime that determines when the media message is available for presentation, wherein selecting the subset of media messages for inclusion in the feed is based on the scheduled airtime, and wherein the media message is not selected as part of the subset of media messages for inclusion in the feed prior to the scheduled airtime.

14. A system, comprising:
    one or more servers including memory, machine-readable instructions, and one or more processors, the one or more processors configured to execute the machine-readable instructions to perform operations comprising:
        receiving, at the one or more servers, a plurality of media messages from one or more mobile applications executable on a corresponding one or more mobile devices;
        storing the plurality of media messages on the one or more servers;
        selecting, for inclusion in a feed, a subset of media messages from among the plurality of media messages stored on the one or more servers; and
        providing the feed from the one or more servers to a mobile application executable on a mobile device, the mobile application configured to present the feed, wherein presentation of the feed by the mobile application includes presentation of an advertisement, an item purchase prompt, a comment prompt, and a sharing prompt with a media message included in the feed, wherein interaction with the item purchase prompt via the mobile application enables a purchase of an item via the mobile application, wherein interaction with the comment prompt via the mobile application enables a comment to be associated with the media message, and wherein interaction with the sharing prompt via the mobile application facilitates generation of a link configured to enable access to the media message.

15. The system of claim 14, wherein respective ones of the plurality of media messages received at the one or more servers include an image or video captured by the one or more mobile applications via a corresponding one or more cameras of the corresponding one or more mobile devices.

16. The system of claim 15, wherein the media message included in the feed includes one or more of an attached image or attached audio that is not native to the image or video captured by the one or more mobile applications via the corresponding one or more cameras of the corresponding one or more mobile devices.

17. The system of claim 14, wherein interaction with the advertisement via the mobile application initiates presentation of additional advertising content.

18. The system of claim 14, wherein the feed is a first feed and the subset of media messages is a first subset of media messages, wherein the operations further comprise:
    selecting, for inclusion in a second feed, a second subset of media messages from among the plurality of media messages stored on the one or more servers, the second feed differing from the first feed; and
    providing the second feed from the one or more servers to the mobile application, the mobile application configured to present the second feed, wherein the mobile application is further configured to switch a presentation of the first feed to a presentation of the second feed in response to a user interaction with the mobile application.

19. The system of claim 14, wherein the feed is a first feed and the subset of media messages is a first subset of media messages, and wherein the mobile application is a first mobile application executable on a first mobile device, wherein the operations further comprise:
    selecting, for inclusion in a second feed, a second subset of media messages from among the plurality of media messages stored on the one or more servers, the second feed differing from the first feed; and
    providing the second feed from the one or more servers to a second mobile application executable on a second mobile device, the second mobile application configured to present the second feed.

20. The system of claim 14, wherein a media message from among the plurality of media messages stored on the one or more servers is associated with a scheduled airtime that determines when the media message is available for presentation, wherein selecting the subset of media messages for inclusion in the feed is based on the scheduled airtime, and wherein the media message is not selected as part of the subset of media messages for inclusion in the feed prior to the scheduled airtime.

21. A system, comprising:
one or more mobile applications executable on a corresponding one or more mobile devices, the one or more mobile applications configured to create a plurality of media messages, wherein respective ones of the plurality of media messages include an image or video captured via a corresponding one or more cameras of the corresponding one or more mobile devices; and
one or more servers including memory, machine-readable instructions, and one or more processors, the one or more processors configured to execute the machine-readable instructions to perform operations comprising:
receiving, at the one or more servers, the plurality of media messages created by the one or more mobile applications;
storing the plurality of media messages on the one or more servers;
selecting, for inclusion in a feed, a subset of media messages from among the plurality of media messages stored on the one or more servers; and
providing the feed from the one or more servers to a mobile application executable on a mobile device, the mobile application configured to present the feed, wherein presentation of the feed by the mobile application includes presentation of an advertisement, an item purchase prompt, a comment prompt, and a sharing prompt with a media message included in the feed, wherein interaction with the item purchase prompt via the mobile application enables a purchase of an item via the mobile application, wherein interaction with the comment prompt via the mobile application enables a comment to be associated with the media message, and wherein interaction with the sharing prompt via the mobile application facilitates generation of a link configured to enable access to the media message.

22. The system of claim 21, wherein interaction with the advertisement via the mobile application initiates presentation of additional advertising content.

23. The system of claim 21, wherein the media message included in the feed includes one or more of an attached image or attached audio that is not native to the image or video captured by the one or more mobile applications via the corresponding one or more cameras of the corresponding one or more mobile devices.

24. The system of claim 21, wherein the feed is a first feed and the subset of media messages is a first subset of media messages, wherein the operations further comprise:
selecting, for inclusion in a second feed, a second subset of media messages from among the plurality of media messages stored on the one or more servers, the second feed differing from the first feed; and
providing the second feed from the one or more servers to the mobile application, the mobile application configured to present the second feed, wherein the mobile application is further configured to switch a presentation of the first feed to a presentation of the second feed in response to a user interaction with the mobile application.

25. The system of claim 21, wherein the feed is a first feed and the subset of media messages is a first subset of media messages, and wherein the mobile application is a first mobile application executable on a first mobile device, wherein the operations further comprise:
selecting, for inclusion in a second feed, a second subset of media messages from among the plurality of media messages stored on the one or more servers, the second feed differing from the first feed; and
providing the second feed from the one or more servers to a second mobile application executable on a second mobile device, the second mobile application configured to present the second feed.

26. The system of claim 21, wherein a media message from among the plurality of media messages stored on the one or more servers is associated with a scheduled airtime that determines when the media message is available for presentation, wherein selecting the subset of media messages for inclusion in the feed is based on the scheduled airtime, and wherein the media message is not selected as part of the subset of media messages for inclusion in the feed prior to the scheduled airtime.

27. The method of claim 1, wherein a media message from among the plurality of media messages stored on the one or more servers is associated with expiration information that determines when the media message is no longer available for presentation, wherein selecting the subset of media messages for inclusion in the feed is based on the expiration information, and wherein the media message is not selected as part of the subset of media messages for inclusion in the feed once the media message is no longer available for presentation.

28. The method of claim 8, wherein a media message from among the plurality of media messages stored on the one or more servers is associated with expiration information that determines when the media message is no longer available for presentation, wherein selecting the subset of media messages for inclusion in the feed is based on the expiration information, and wherein the media message is not selected as part of the subset of media messages for inclusion in the feed once the media message is no longer available for presentation.

29. The system of claim 14, wherein a media message from among the plurality of media messages stored on the one or more servers is associated with expiration information that determines when the media message is no longer available for presentation, wherein selecting the subset of media messages for inclusion in the feed is based on the expiration information, and wherein the media message is not selected as part of the subset of media messages for inclusion in the feed once the media message is no longer available for presentation.

30. The system of claim 21, wherein a media message from among the plurality of media messages stored on the one or more servers is associated with expiration information that determines when the media message is no longer available for presentation, wherein selecting the subset of media messages for inclusion in the feed is based on the expiration information, and wherein the media message is not selected as part of the subset of media messages for inclusion in the feed once the media message is no longer available for presentation.

* * * * *